Dec. 11, 1923.

O. OLSSON 1,477,519

LUBRICATING DEVICE FOR WINDMILLS

Filed Oct. 24, 1922   3 Sheets-Sheet 1

WITNESSES

INVENTOR
Ored Olsson
BY
ATTORNEYS

Dec. 11, 1923.  O. OLSSON  1,477,519
LUBRICATING DEVICE FOR WINDMILLS
Filed Oct. 24, 1922   3 Sheets-Sheet 2
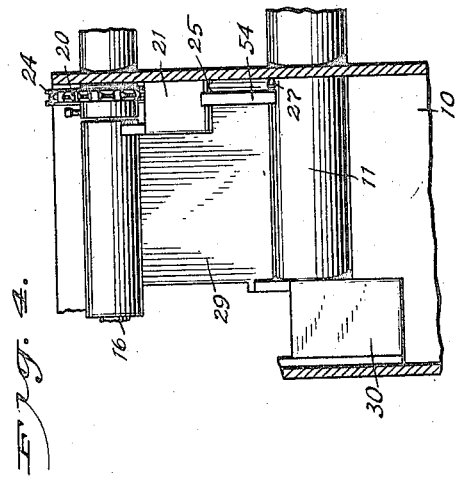
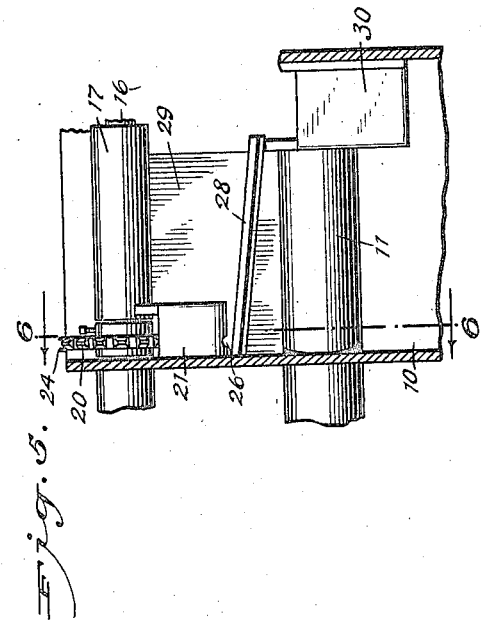
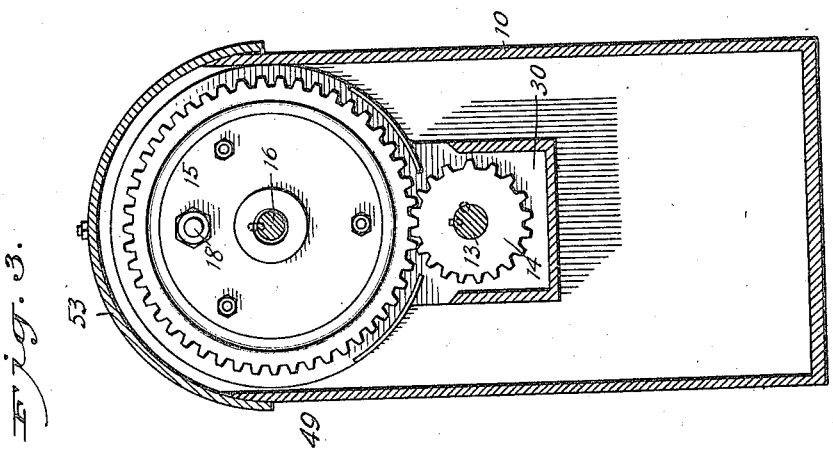
WITNESSES
INVENTOR
Ored Olsson
BY
ATTORNEYS Dec. 11, 1923.
O. OLSSON
1,477,519
LUBRICATING DEVICE FOR WINDMILLS
Filed Oct. 24, 1922    3 Sheets-Sheet 3
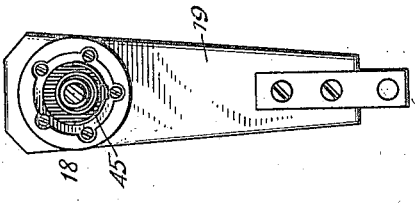
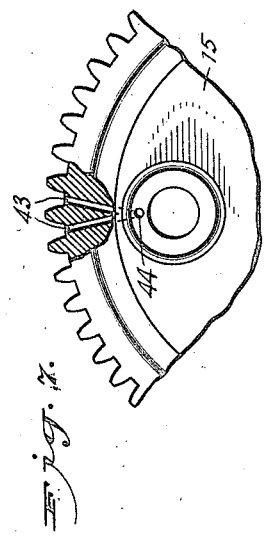
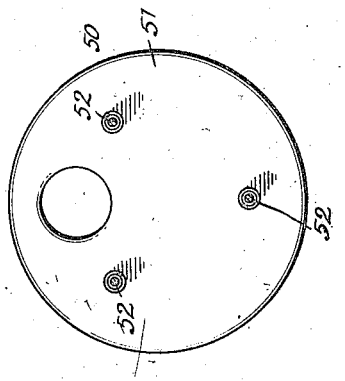
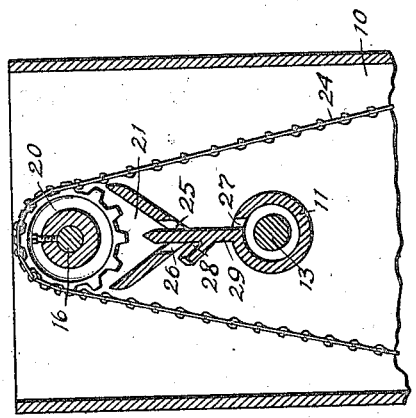
WITNESSES
INVENTOR
Ored Olsson
BY
ATTORNEYS Patented Dec. 11, 1923.

1,477,519

UNITED STATES PATENT OFFICE.

ORED OLSSON, OF ORD, NEBRASKA.

LUBRICATING DEVICE FOR WINDMILLS.

Application filed October 24, 1922. Serial No. 596,614.

*To all whom it may concern:*

Be it known that I, ORED OLSSON, a citizen of the United States, and a resident of Ord, in the county of Valley and State of Nebraska, have invented a new and Improved Lubricating Device for Windmills, of which the following is a full, clear, and exact description.

This invention has relation to windmills and has particular reference to a lubricating device therefor.

The invention contemplates for its principal object a device for automatically conveying to the moving elements of a windmill lubricant in order to minimize friction and wear on the parts.

As a further object the invention contemplates an automatic lubricating system for windmills which obviates the necessity of having to frequently climb to the top of the windmill supporting structure for the purpose of manually lubricating the various bearings and moving parts.

The invention furthermore contemplates a lubricating system for windmills which is extremely simple in its construction and does not materially increase the cost of manufacture, and which is thoroughly reliable and highly efficient in its purpose.

With the above recited and other objects in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figures 1, 2:
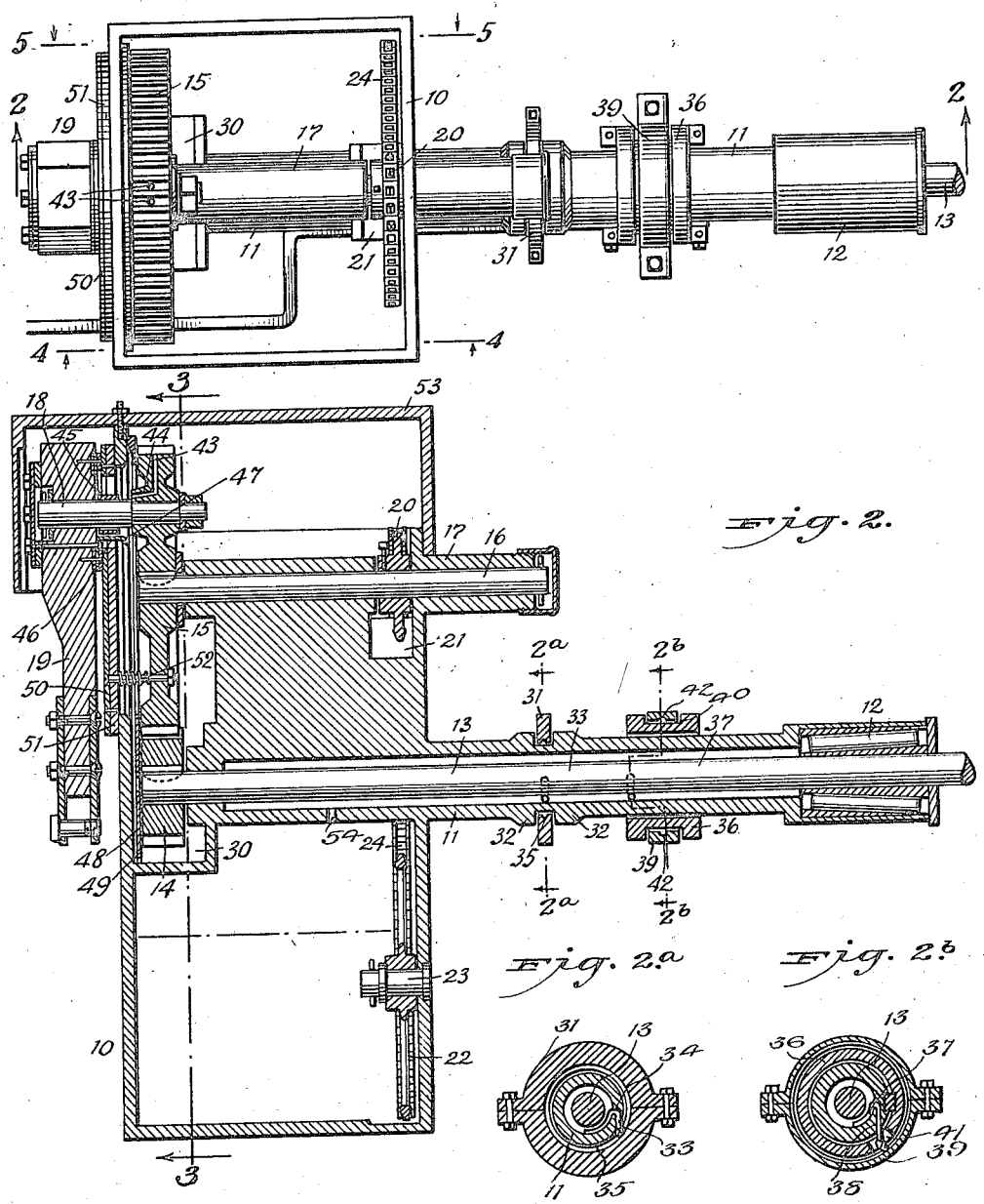
Figure 1 is a fragmentary plan view of the upper portion of a windmill with the propeller wheel removed.
Fig. 2 is a vertical sectional view therethrough taken approximately on the line 2—2 of Fig. 1.

Fig. 2ª is a transverse sectional view taken approximately on the line 2ª—2ª of Fig. 2.

Fig. 2ᵇ is a transverse sectional view taken approximately on the line 2ᵇ—2ᵇ of Fig. 2.

Fig. 3 is a transverse sectional view taken approximately on the line 3—3 of Fig. 2.

Fig. 4 is a fragmentary sectional view taken approximately on the line 4—4 of Fig. 1.

Fig. 5 is a similar view taken approximately on the line 5—5 of Fig. 1.

Fig. 6 is a fragmentary sectional view taken approximately on the line 6—6 of Fig. 5.

Fig. 7 is a fragmentary front view of the driven gear, parts being shown in section to disclose the underlying structure.

Fig. 8 is a face view of the dustproof packing plate or disk.

Fig. 9 is a face view of the upper end of the pitman.

Referring to the drawings by characters of reference, 10 designates a housing or casing which is supported from the upper end of the windmill frame structure which is provided with a tubular bearing 11 extending therethrough and projecting from one side of the casing, said bearing being provided at its outer end with an anti-friction roller bearing 12. The windmill driving shaft 13 extends through the tubular bearing sleeve 11 and is provided at its inner end with a drive pinion 14 keyed thereto. A driven gear 15 is mounted on a countershaft 16 supported by the tubular bearing 17 provided in the housing. The driven gear 15 is provided with an eccentric crank pin 18 which extends through and connects with the pitman head 19 which is in turn connected with and reciprocates the pump rod (not shown). The countershaft 16 has secured thereto a sprocket 20 directly beneath which an oil hopper 21 is disposed. A second sprocket 22 is mounted on a stub shaft 23 in the lower portion of the housing or casing 10 and said sprockets are operatively connected by a sprocket chain 24 which causes simultaneously driving of the sprocket 22 with the sprocket 20 when the countershaft is rotated with the driven gear 15. The lower end of the housing or casing 10 constitutes a reservoir or container for a supply of lubricating oil in which the lower sprocket 22 and the sprocket chain 24 are partially submerged. The oil hopper 21 is provided with outlet openings 25 and 26, the former outlet being disposed in vertical alignment with a subterposed aperture 27 in the tubular bearing 11 whereby a portion of the oil which is conveyed by the chain and dropped into the oil hopper 21 is fed therefrom through the outlet 25 to the tubular bearing 11 through the aperture 27. The opposite outlet opening 26 of the oil hopper 21 is disposed immediately above an inclined conduit 28 which is in the nature of a flange formed on the side of a web 29 provided on the tubular bearing 11. The drive pinion 14 is arranged within an oil box 30 over which the lower end of the conduit 28 is disposed for conveying and supplying oil to the oil box 30 from the oil hopper 21.

The oil which is fed through the aperture 27 to the tubular bearing 11 is conveyed by the same to the roller bearing 12 for lubricating said roller bearing. The propeller wheel is provided with a rotary bearing collar 31 which is mounted between the annular beads 32 on the tubular bearing and said rotary bearing collar is lubricated by a wick 33 which passes through the aperture 34 in the side of the tubular bearing 11, said wick conveying the oil by saturation from the interior of the tubular bearing to an oil groove 35 in the inner periphery of the collar 31. A sliding sleeve 36 mounted for movement on the tubular bearing is lubricated by a wick 37 which is passed through the aperture 38 in the side of the tubular bearing and feeds oil to the inner periphery of the sleeve. A rotary ring 39 mounted in the annular groove 40 of the sliding sleeve is lubricated through the aperture 41 in said sleeve which conveys the oil to the inner peripheral groove 42 of the ring 39. In order to convey the lubricant to the crank pin 18, the driven gear is provided with oil passages 43 in its periphery on opposite sides of one of the teeth, said oil passages terminating in a common passage 44 which is inclined downwardly to discharge directly onto the crank pin. A loose ring 45 is arranged on the crank pin and confined between the confronting faces of the driven gear 15 and the pitman head 19. A drain plate 46 is carried by the pitman head and is provided at the inner end with a downturned spout 47 whereby superfluous oil or lubricant is returned by means of the spout from the crank pin to the oil box, said spout emptying into an oil conveying space 48 defined by the plate 49 secured to the inner side of one of the walls of the housing or casing 10. In order to render the interior of the casing or housing 10 dust, dirt and moisture-proof, a disk 50 having a facing 51 is impinged against the side of the housing and supported from the driven gear 15 by means of spring pressed bolts 52. The upper open end of the housing or casing 10 is closed by a covering hood 53 which also extends over and partly embraces the pitman head 19.

In use and operation of the invention, the lower end of the casing or housing 10 is filled with a supply of oil or other lubricant whereby the same constitutes a reservoir. When the drive shaft 13 is rotated by the propeller wheel the countershaft 16 will be simultaneously rotated through the interengagement of the meshing drive and driven gears 14 and 15, thus operating the sprockets 20 and 22 and the sprocket chain 24 which will lift and feed the oil or lubricant from the reservoir to the hopper 21. From this point the oil will be discharged respectively through the apertures 25 and 26. From the aperture 25 the oil will flow into the aperture 27 between the guard strip 54 and the side of the housing or casing. This will introduce oil to the interior of the tubular bearing 11 where it will feed the wicks 33 and 37 and the roller bearing 12, thus lubricating the rotary bearing collar 31 for the angular bracing spokes of the propeller wheel and the main bearing for the drive shaft as well as the sliding sleeve 36 and the ring 39. The lower periphery of the tubular bearing 11 is provided with a discharge opening 54 which permits the lubricant in excess of the amount needed to return into the bottom of the casing or housing 10 from the hollow sleeve. From the aperture 26 the oil will flow through the conduit 28 to the oil box 30 from whence it will be conveyed from the gear teeth of the gear 14 to the gear teeth of the gear 15. When the portion of the gear 15 which is provided with the oil passages 43 arrives at the top of its cycle of movement, the oil on the periphery will flow through the passages 43 to the common passage 44 where it will flow onto the crank pin. The loose ring 45 will spread the oil and effect proper lubrication between the crank pin and the bearing opening in the pitman head 19. Superfluous oil from the crank pin will be caught by the drain plate 46 of the pitman head and returned through the downturned spout 47 to the oil conveying space 48 defined between the plate 49 and the side wall of the housing or casing back to the oil box. Should the oil box 30 overflow the superfluous oil therefrom will drain directly back into the bottom of the housing or casing which constitutes the initial reservoir. In event that the feed hopper 21 is overfed, the oil will likewise drain back into the bottom of the housing or casing.

From the foregoing it will thus be seen that an automatic system for lubricating the moving parts and bearings of the windmill has been provided which insures the proper operation of the mill.

I claim:

1. In a windmill, a lubricating casing, a sleeve projecting from one side of the casing, a shaft mounted in the sleeve and having an end projecting into the casing, a counter shaft mounted in said casing, gears operatively connecting the counter shaft with the first mentioned shaft, said casing adapted to contain a predetermined level of oil, a hopper mounted adjacent the counter shaft, elevating means for distributing oil from the bottom of the casing to the hopper, said hopper being provided with conduits, one of said conduits being directed to the first mentioned sleeve, an inclined conduit in communication with the second conduit leading from the hopper, and directed toward the cooperating gears for carrying lubricant to said gears.

2. In a windmill, a lubricating casing, a sleeve projecting from one side of the casing, a shaft mounted in the sleeve and having an end projecting into the casing, a countershaft mounted in said casing, gears operatively connecting the counter shaft with the first mentioned shaft, said casing adapted to contain a predetermined level of oil, a hopper mounted adjacent the countershaft, elevating means for distributing oil from the bottom of the casing to the hopper, said hopper being provided with conduits, one of said conduits being directed to the first mentioned sleeve, an inclined conduit in communication with the second conduit, leading from the hopper and directed toward the cooperating gears for carrying lubricant to said gears, a crank pin connected with one of the gears, said gear being provided with oil ducts therethrough adapted to deliver lubricant to the crank pin.

3. In a windmill, a lubricating casing, a sleeve projecting from one side of the casing, a shaft mounted in the sleeve and having an end projecting into the casing, a countershaft mounted in said casing, gears operatively connecting the counter shaft with the first mentioned shaft, said casing adapted to contain a predetermined level of oil, a hopper mounted adjacent the counter shaft, elevating means for distributing oil from the bottom of the casing to the hopper, said hopper being provided with conduits, one of said conduits being directed to the first mentioned sleeve, an inclined conduit in communication with the second conduit leading from the hopper and directed toward the cooperating gears for carrying lubricant to said gears, an oil receptacle projecting from the end of the sleeve adapted to supply lubricant to one of the cooperating gears.

4. In a windmill, a lubricating casing, a sleeve projecting from one side of the casing, a shaft mounted in the sleeve and having an end projecting into the casing, a counter shaft mounted in said casing, gears operatively connecting the counter shaft with the first mentioned shaft, said casing adapted to contain a predetermined level of oil, a hopper mounted adjacent the counter shaft, elevating means for distributing oil from the bottom of the casing to the hopper, said hopper being provided with conduits, one of said conduits being directed to the first mentioned sleeve, an inclined conduit in communication with the second conduit leading from the hopper and directed toward the cooperating gears for carrying lubricant to said gears, bearings mounted along the sleeve, and ducts in said sleeve for supplying lubricant to said bearings.

5. In a windmill, a lubricating casing, a sleeve projecting from one side of the casing, said casing being provided with a circular opening at its opposite side, a shaft mounted in the sleeve and having an end projecting into the casing, a counter shaft mounted in said casing, gears operatively connecting the counter shaft with the first mentioned shaft, said casing adapted to contain a predetermined level of oil, a hopper mounted adjacent the counter shaft, elevating means for distributing oil from the bottom of the casing to the hopper, said hopper being provided with conduits, one of said conduits being directed to the first mentioned sleeve, an inclined conduit in communication with the second conduit leading from the hopper and directed toward the cooperating gears for carrying lubricant to said gears, one of the cooperating gears being provided with a crank pin through the circular opening in the casing, a disc mounted on the crank pin, and resilient means conecting the disc with the gear for maintaining said disc in face to face engagement with the casing adjacent the periphery of the opening to prevent the loss of lubricant from said casing.

ORED OLSSON.